US010474605B2

(12) United States Patent
Hsieh

(10) Patent No.: US 10,474,605 B2
(45) Date of Patent: Nov. 12, 2019

(54) SERVER SYSTEM AND DATA ACCESS METHOD USING THE SAME

(71) Applicant: Wistron Corporation, New Taipei (TW)

(72) Inventor: Cheng-Kuang Hsieh, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 230 days.

(21) Appl. No.: 15/210,901

(22) Filed: Jul. 15, 2016

(65) Prior Publication Data

US 2017/0293580 A1 Oct. 12, 2017

(30) Foreign Application Priority Data

Apr. 12, 2016 (TW) .............................. 105111298 A

(51) Int. Cl.
*G06F 13/38* (2006.01)
(52) U.S. Cl.
CPC .................................. *G06F 13/385* (2013.01)
(58) Field of Classification Search
None
See application file for complete search history.

(56) References Cited

U.S. PATENT DOCUMENTS

2009/0024746 A1   1/2009  Welch
2014/0025850 A1*  1/2014  Varchavtchik ........ G06F 3/0689
                                                         710/74
2015/0106644 A1   4/2015  Lin et al.
2016/0132358 A1*  5/2016  Antony ................. G06F 9/5044
                                                         726/4
2016/0210259 A1*  7/2016  Tsirkin ................ G06F 13/4045
2017/0228247 A1*  8/2017  Aron .................... G06F 9/45558

FOREIGN PATENT DOCUMENTS

CN    102622279 A    8/2012
CN    104077424 A    10/2014
TW    I356311        1/2012
TW    201516634     5/2015

OTHER PUBLICATIONS

"Office Action of Taiwan Counterpart Application," dated May 15, 2017, with English translation thereof, p. 1-p. 7.

* cited by examiner

*Primary Examiner* — Scott C Sun
(74) *Attorney, Agent, or Firm* — Winston Hsu

(57) ABSTRACT

A server system and a data access method using the same are provided. The server system includes a first server and a second server. The first server includes a first host, a first expander unit and a first peripheral device. The first expander unit is coupled to the first host, and the first peripheral device is coupled to the first expander unit. The second server includes a second host, a second expander unit and a second peripheral device. The second expander unit is coupled to the second host, and the second peripheral device is coupled to the second expander unit. The first expander unit is connected to the second expander unit. The first host accesses the first peripheral device through the first expander unit. The first host further accesses the second peripheral device through the first expander unit and the second expander unit while the second host malfunctions.

12 Claims, 5 Drawing Sheets

SERVER SYSTEM AND DATA ACCESS METHOD USING THE SAME

CROSS-REFERENCE TO RELATED APPLICATION

This application claims the priority benefit of Taiwan application serial no. 105111298, filed on Apr. 12, 2016. The entirety of the above-mentioned patent application is hereby incorporated by reference herein and made a part of this specification.

BACKGROUND OF THE INVENTION

1. Field of the Invention

The invention relates to a server system and a data access method using the same, and particularly relates to a server system with an adjustable access setting and a data access method using the same.

2. Description of Related Art

With the emergence of virtualization and cloud service, the server system nowadays are developed toward being able to undertake more virtual machines, such as offering more memory slots. Thus, in the design of server system, a design of installing two or more physical servers and a certain number of storage devices within the space of one case is developed. Such server system is referred to as high density storage server.

The high density storage sever is special in its capability of installing a large number of storage devices (e.g., hard drives) therein. Generally speaking, the reading and writing performance of solid state drives are superior to the conventional hard drives. However, the solid state drives are very expensive, and the storage capacity per unit of the solid state drives is less preferable than that of the conventional hard drives. In practices, a significant number of solid state drives may be used to cope with the needs for mass storage and the requirements on reading and writing performance. However, the cost for the solid state drives is very high. Under such circumstance, how to design a server system with a preferable management mechanism to effectively prevent the storage devices from idling, which causes unnecessary waste of resources, when accessing of the physical server is anomalous but the storage devices are still operable is certainly an issue for researchers in this field to work on.

SUMMARY OF THE INVENTION

The invention provides a server system and a data access method using the same. According to the system and method, when one of the hosts of the server system malfunctions, a peripheral device originally controlled by the malfunctioning host may be taken over and controlled by another host that normally operates, so as to prevent hardware resources from being wasted.

A server system according to an embodiment of the invention includes a first server and a second server. The first server includes a first host, a first expander unit, and a first peripheral device. The first expander unit is coupled to the first host, and the first peripheral device is coupled to the first expander unit. The second server includes a second host, a second expander unit, and a second peripheral device. The second expander unit is coupled to the second host, and the second peripheral device is coupled to the second expander unit. The first expander unit is connected to the second expander unit. The first host accesses the first peripheral device through the first expander unit, and when the second host malfunctions, the first host accesses the second peripheral device through the first expander unit and the second expander unit.

A data access method according to an embodiment of the invention is suitable for a server system. The server system includes a first server and a second server. The first server includes a first host, a first expander unit, and a first peripheral device, and the second host includes a second host, a second expander unit, and a second peripheral device. The first expander unit is connected to the second expander unit. The data access method includes steps as follows. Whether the second host malfunctions is determined. The second peripheral device is accessed through the first expander unit and the second expander unit by using the first host when the second host malfunctions.

Based on the above, in the server system, the first host is coupled to the first peripheral device, and the second host is coupled to the second peripheral device. Therefore, the hosts in the server system may separately control a portion of the peripheral devices to optimize the number of peripheral devices controlled by each host. In the embodiments of the invention, the first expander unit and the second expander unit of the server system are specifically connected to each other so that the first host may take over and access the second peripheral device when the second host malfunctions. In this way, when the second host malfunctions, the second peripheral device originally controlled by the malfunctioning second host may remain accessible, thereby preventing hardware resources from being wasted.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
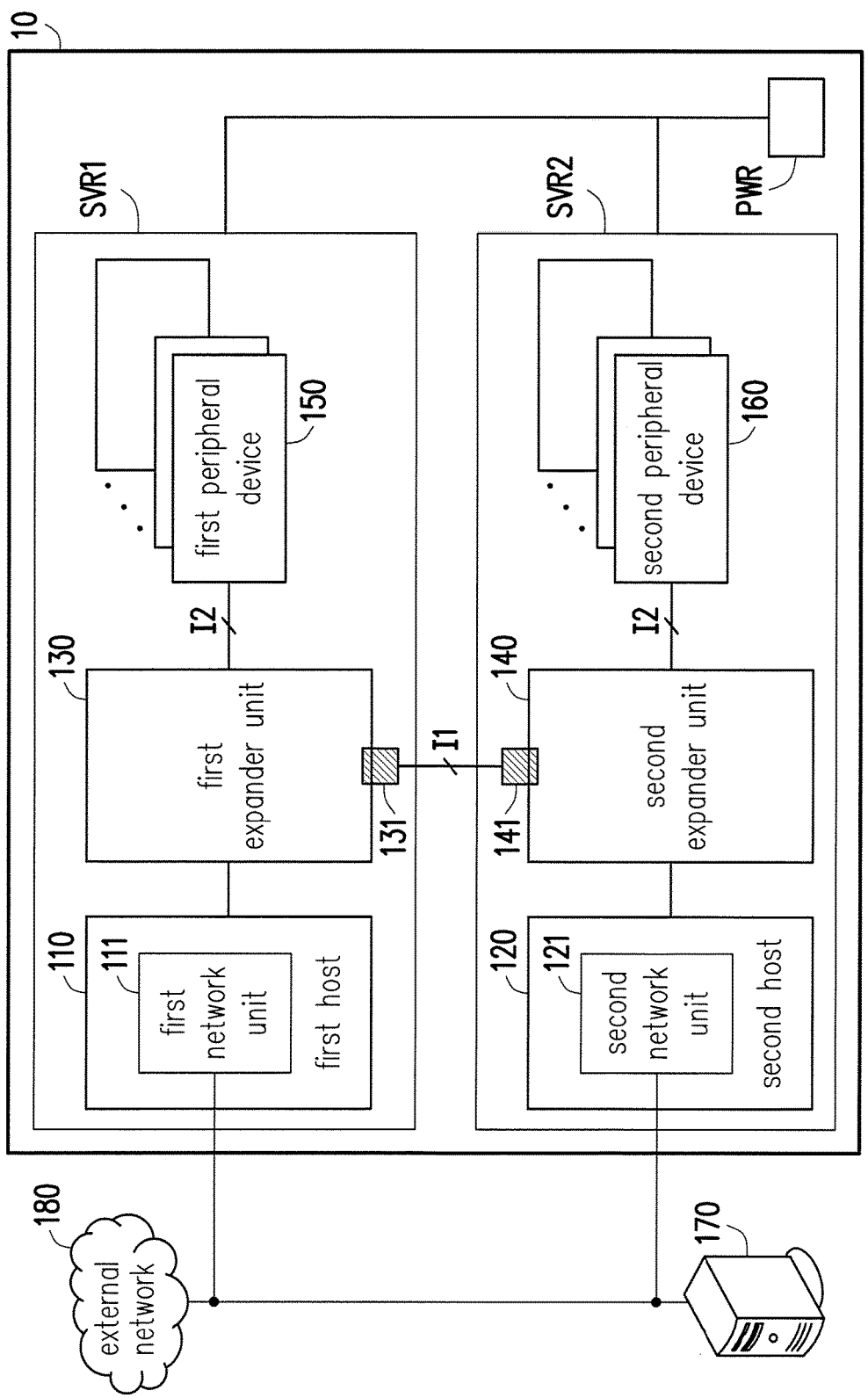
FIG. 1 is a block view illustrating a server system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Several embodiments are described below to illustrate the invention. However, the invention is not limited to the embodiments described in the following. FIG. 1 is a block view illustrating a server system according to an embodiment of the invention. Referring to FIG. 1, a server system 100 includes a first server SVR1 and a second server SVR2.

The server system 100 also includes a power module PWR. The power module PWR is respectively electrically connected to the first server SVR1 and the second server SVR2, and adapted to provide power required for the first server SVR1 and the second server SVR2. The power module PWR may be a distributed power supply device or a power supply. In this embodiment, the server system 110 is installed in a case 10. The first server SVR1 includes a first host 110, a first expander unit 130, and a first peripheral device 150. The second server SVR2 includes a second host 120, a second expander unit 140, and a second peripheral device 160. The first expander unit 130 is coupled to the first host 110, and the first peripheral device 150 is coupled to the first expander unit 130. The second expander unit 140 is coupled to the second host 120, and the second peripheral device 160 is coupled to the second expander unit 140. It should be noted that, in this embodiment, the server system 100 includes two servers, but the invention is not limited thereto. Namely, in other embodiments, the server system may include more servers, hosts, expander units, and peripheral devices, and the number of servers is not limited to 2.

In this embodiment, the first expander unit 130 further includes a first connection port 131, and the second expander unit 140 further includes a second connection port 141. In addition, the first connection port 131 and the second connection port 141 are connected to each other through a first transmission interface I1. Particularly, in this embodiment, even though the first expander unit 130 is connected to the second expander unit 140, the first connection port 131 and the second connection port 141 are set in default as connection ports having the same transmission direction. Thus, when the respective components operate normally, the first host 110 accesses the first peripheral device 150 through the first expander unit 130, and the second host 120 accesses the second peripheral device 160 through the second expander unit 140. In other words, when the first connection port 131 and the second connection port 141 are disposed as connection ports having the same transmission direction, the first server SVR1 and the second server SVR2 are two servers working independently without interfering each other.

In this embodiment, the first peripheral device 150 is a storage device including a plurality of hard drives, and the first expander unit 130 is connected to the hard drives through a second transmission interface I2. Similarly, the second peripheral device 160 is also a storage device including a plurality of hard drives, and the second expander unit 140 is also connected to the hard drives through the second transmission interface I2. Here, the second transmission interface I2 is set based on transmission interfaces of the first peripheral device 150 and the second peripheral device 160. It should be noted that, in this embodiment, the numbers of hard drives included in the first peripheral device 150 and the second peripheral device 160 may be determined based on the accessing and computing capabilities of the first host 110 and the second host 120, so as to optimize the quantities of the hard drives each host is able to access. In addition, the invention does not intend to limit the types of the first peripheral device 150 and the second peripheral device 160. In other embodiments, the first peripheral device 150 and the second peripheral device 160 may also be other types of peripheral devices such as an optical drive or a printer, etc.

Besides, in this embodiment, the first host 110 further includes a first network unit 111, and the second host 120 further includes a second network unit 121. The first network unit 111 and the second network unit 121 are respectively adapted to connect the first host 110 and the second host 120 to an external network 180. Thus, in this embodiment, the first host 110 and the second host 120 may communicate with each other by using the external network 180. In addition, the first host 110 and the second host 120 maybe, for example, respectively connected to the external network 180 and to a third host 170, and respectively communicate with the third host 170. The first network unit 111 and the second network unit 121 include a network card or a network protocol processing chip, for example.

Figure 2:
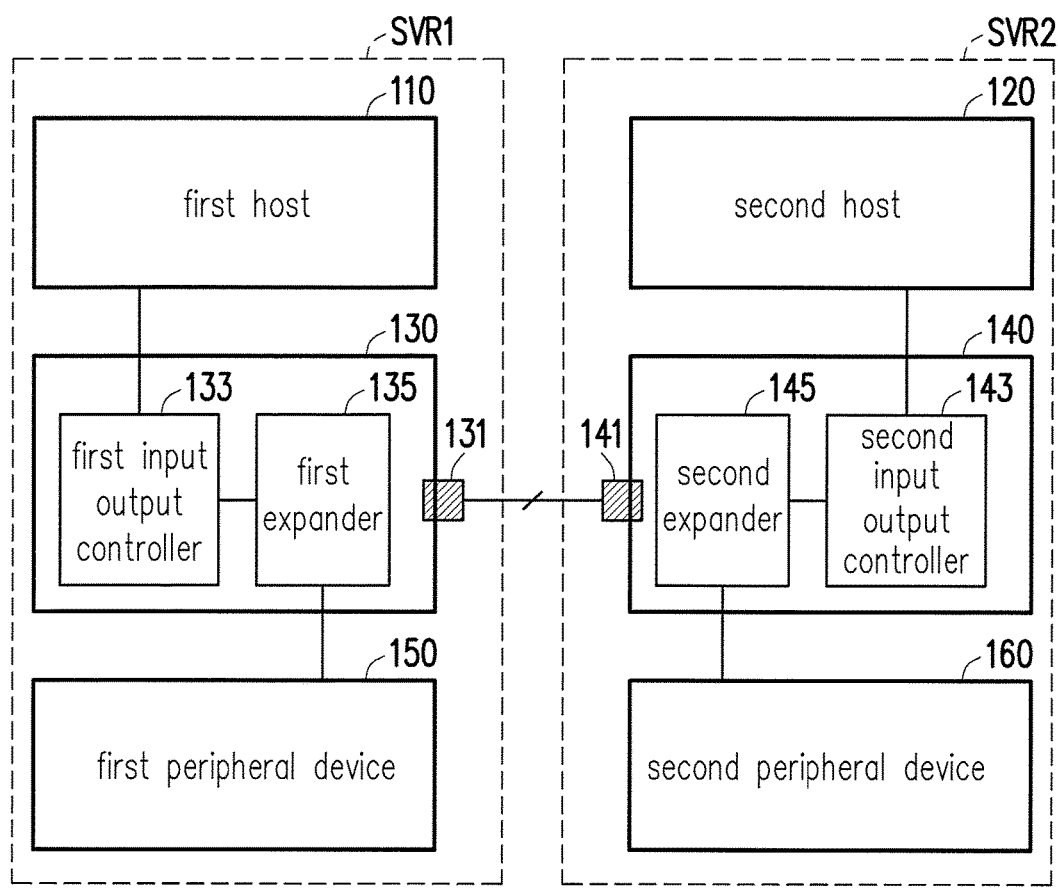
FIG. 2 is a schematic view illustrating a data access method according to an embodiment of the invention.
Figure 3:
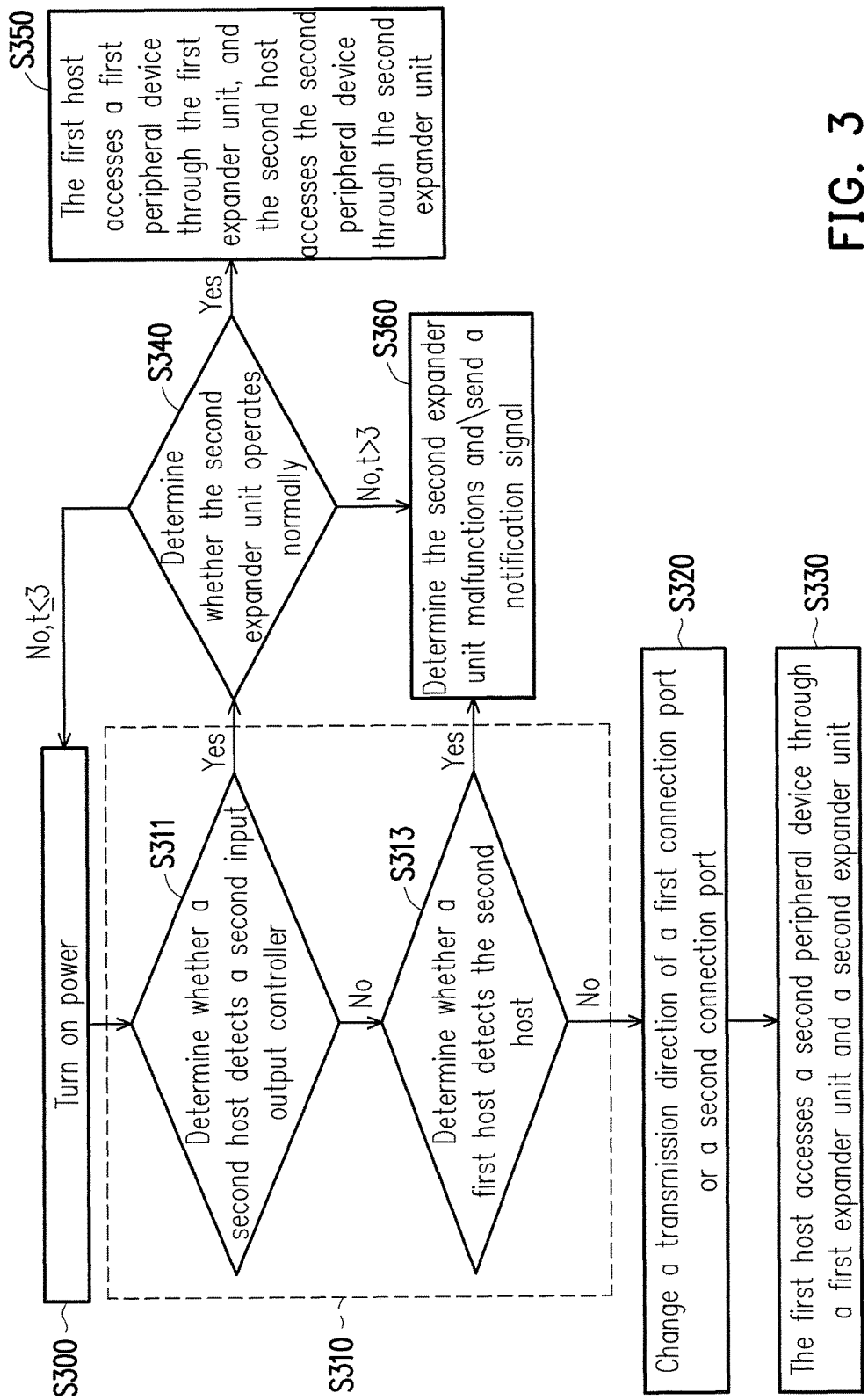
FIG. 3 is a flowchart illustrating a data access method according to an embodiment of the invention.

FIG. 2 is a schematic view illustrating a data access method according to an embodiment of the invention. FIG. 3 is a flowchart illustrating a data access method according to an embodiment of the invention. The method in this embodiment is suitable for the server system 100 shown in FIG. 1. In the following, details concerning the method of this embodiment are described with reference to the components of the server system 100 of FIG. 1.

Referring to FIG. 2, in this embodiment, the server system 100 is implemented based on FIG. 2, for example. The first transmission interface I1 and the second transmission inter-face I2 are, for example, serial attached small computer system interfaces (SAS). The first connection port 131 and the second connection port 141 are, for example, SFF-8087 (Mini-SAS) adapters and set in default as uplink connection ports. In this embodiment, the first expander unit 130 includes the first connection port 131, a first input output controller 133, and a first expander 135. The first host 110 is connected to the first input output controller 133 through a peripheral component interconnect express (PCI-E) bus, and the first input output controller 133 is adapted to convert a signal compatible with the PCI-E standard into an SAS-compatible signal, and transmit the converted signal to the first expander 135. The first expander 135 has a plurality of connection ports, and is connected to the first connection port 131 and the first peripheral device 150 by using the connection ports through the second transmission interface I2.

Moreover, in this embodiment, the second server SVR2 and the first server SVR1 are disposed symmetrically. In other words, the second expander unit 140 includes the second connection port 141, a second input output controller 143, and a second expander 145. In addition, the way that the second expander unit 140 connects to the second host 120 and the second peripheral device 160 is the same as the way of the first server SVR1. Details in this respect are thus not repeated in the following.

Referring to FIG. 3, in this embodiment, after the server system 100 is turned on at Step S300, Step S310 is carried out. At Step S310, the server system 100 determines whether the second host 120 malfunctions, and the determination process at Step S310 further includes Step S311 to S313. Details in this respect are described in the following for example. At Step S311, the first host 110 determines whether the second host 120 detects the second expander unit 140. In this embodiment, the first host 110 determines whether the second host 120 detects the second input output controller 143 of the second expander unit 140 at Step S311.

In this embodiment, since the first host 110 and the second host 120 are connected to the external network 180, the first host 110 may communicate with the second host 120 through the external network 180. For example, the second host 120 may notify the first host 110 whether the second host 120 successfully detects the second input output controller 143 by sending a notification signal. Alternatively, as another example, the second host 120 may send a notification signal to the third host 170, and the first host 110 may be notified whether the second host 120 successfully detects the second input output controller 143 by the third host 170. Nevertheless, the invention does not intend to impose a limitation in this regard. In other embodiments, the first host 110 and the second host 120 may communicate with each other through Bluetooth, a local area network (LAN), or other transmission methods.

At Step S311, if the first host 110 determines that the second host 120 successfully detects the second input output controller 143, it is indicated that the second host 120 and the second input output controller 143 do not malfunction. Then, Step S340 is carried out. At Step S340, the second host 120 or the second input output controller 143 of the server system 100 determines whether the second expander unit 140 operates normally. For example, the second host 120 or the second input output controller 143 may detect the second expander 145. If it is detected that the second expander 145 is normally connected to the second peripheral device 160, at Step S350, the first host may access the first peripheral device 150 through the first expander unit 130, and the second host 120 may access the second peripheral device 160 through the second expander unit 140. Alternatively, if the second expander 145 is not detected to be normally connected to the second peripheral device 160, it is suggested that a setting error may occur when the server system 100 is turned on, so the server system 100 is rebooted. However, in this embodiment, if the second expander 145 is still not detected to be normally connected to the second peripheral device 160 at Step S340 after rebooting the server system 100 for a number of times (e.g., t times), it may be indicated that the second expander unit 140 malfunctions. Under such circumstance, Step S360 is carried out, and the first host 110 or the second host 120 may send a notification signal to notify the administrator to repair the second expander unit 140. In this embodiment, t is 3.

At Step S311, if the first host 110 determines that the second host 120 does not successfully detect the second expander unit 140, it is indicated that at least one of the second host 120 and the second expander unit 140 malfunctions. Thus, Step S313 is carried out. At Step S313, the first host 110 may further detect the second host 120 to determine whether the second host 120 malfunctions. In this embodiment, the first host 110 may detect whether the second host 120 normally operates based on an external network address (e.g., IP address) of the second host 120, for example. However, in other embodiments, the first host 110 may also detect whether the second host 120 normally operates based on a Bluetooth address or a LAN address, for example. It should be understood that the invention does not intend to impose a limitation in this regard. If the first host 110 detects the second host 120 at Step S313, it is indicated that the second host 120 operates normally without malfunctioning, so it is determined that the second expander unit 140 malfunctions. Accordingly, at Step S360, the first host 110 or the second host 120 sends a notification signal to notify the administrator to repair the second expander unit 140.

Alternatively, if the first host 110 does not detect the second host 120 at Step S313, it is determined that the second host 120 malfunctions, and Step S320 is carried out. At Step S320, the transmission direction of the first connection port 131 or the second connection port 141 is changed, such that the first host 110 is able to access the second peripheral device 160 through the first expander unit 130 and the second expander unit 140. In this embodiment, the first connection port 131 and the second connection port 141 are set in default as uplink connection ports. Thus, when the second host 120 malfunctions, the first connection port 131 is changed into a downlink connection port by using the first expander 135. Consequently, the first host 110 is able to access the second peripheral device 160 through the first expander unit 130 and the second expander unit 140 at Step S330.

In this embodiment, the first connection port 131 and the second connection port 141 are set in default as uplink connection ports, and when the second host 120 malfunctions, the first connection port 131 is changed into a downlink connection port by using the first expander 135, such that the first host 110 is able to access the second peripheral device 160 through the first connection port 131 and the second port 141. However, in another embodiment, the first connection port 131 and the second connection port 141 may also be set in default as downlink connection ports, for example. In addition, when the second host 120 malfunctions, the second connection port 141 is changed into an uplink connection port by using the second expander 145, such that the first host 110 is able to access the second peripheral device 160 through the first connection port 131 and the second connection port 141. It should be understood that the invention does not intend to impose a limitation in this regard.

Based on the server system 100 and the data access method according to the embodiments of the invention, when the second host 120 malfunctions and the second expander unit 140 does not malfunction, the second peripheral device 160 originally controlled by the second host 120 may be released to be taken over and accessed by the first host 110 by changing the transmission direction of the first connection port 131 or the second connection port 141.

In the previous embodiments, the first transmission interface I1 and the transmission interface I2 are SAS interfaces, for example, and adapters of the respective components are, for example, SFF-8482 (Serial Advanced Technology Attachment, SATA) adapters, SFF-8484 adapters, SFF-8470 adapters, or other adapters compatible with the SAS interface. Sufficient teaching, suggestions, and descriptions concerning how to modify the adapters are already provided in the conventional knowledge in the technical field. Thus, details in this respect will not be repeated in the following.

In the previous embodiments, hard drives included in the first peripheral device 150 and the second peripheral device 160 are conventional hard drives, for example. However, to meet the requirements on reading and writing performance, solid state drives may often be a feasible option. Even though the reading and writing performance of the solid state drive is superior to the conventional hard drive, its storage capacity is smaller than the storage capacity of the conventional hard drive and also takes up a hard drive slot. Thus, in some embodiments, a solid state drive with a PCI-E interface is used to expand the storage capacity. For such purpose, further to the SAS interface described in the previous embodiments, an interface compatible with the PCI-E standard may also be adopted for all the transmission interfaces of the server system 100 in another embodiment of the invention, for example. Details in this respect are described in the following.

Figure 4:
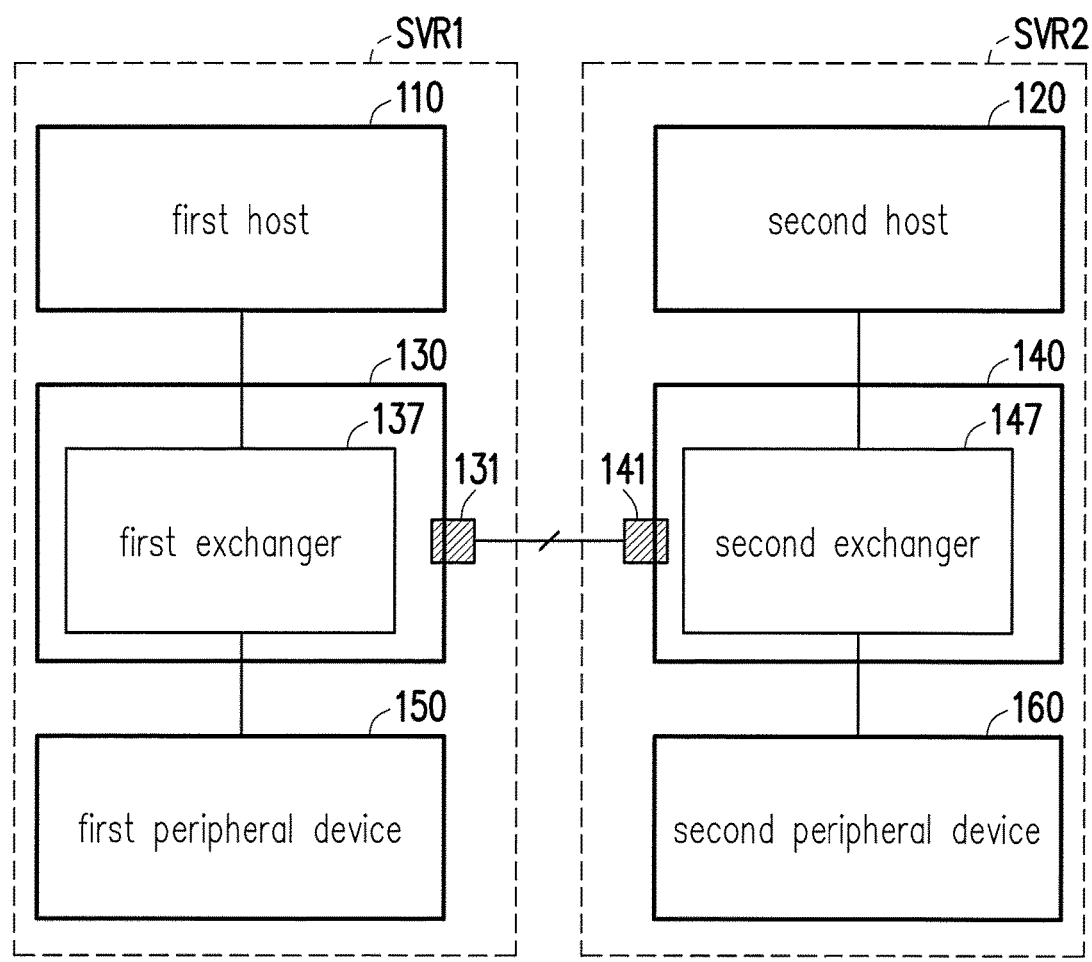
FIG. 4 is a schematic view illustrating a data access method according to another embodiment of the invention.
Figure 5:
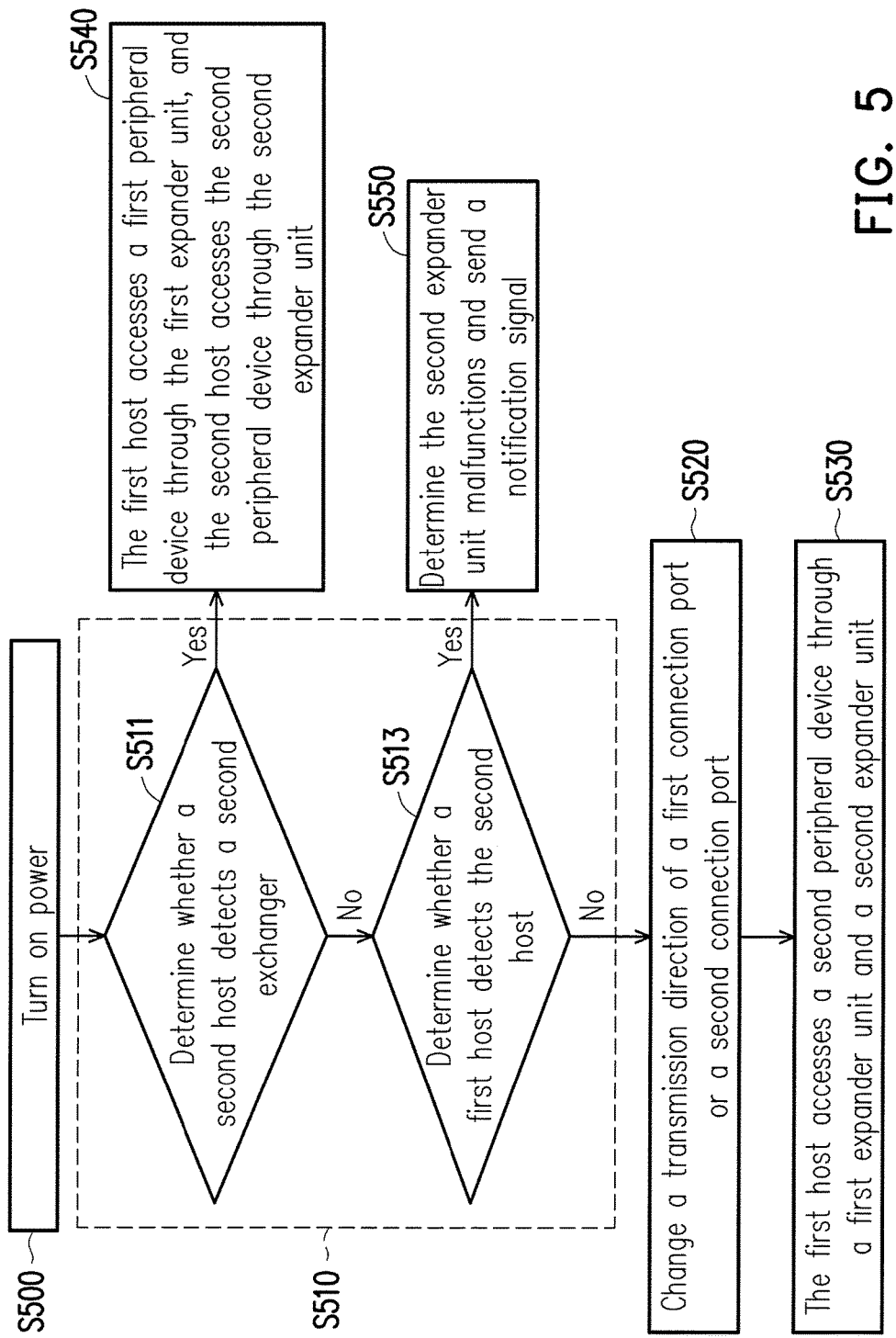
FIG. 5 is a flowchart illustrating a data access method according to another embodiment of the invention.

FIG. 4 is a schematic view illustrating a data access method according to an embodiment of the invention. FIG. 5 is a flowchart illustrating a data access method according to an embodiment of the invention. The method in this embodiment is suitable for the server system 100 shown in FIG. 1. In the following, details concerning the method of this embodiment are described with reference to the components of the server system 100 of FIG. 1.

Referring to FIG. 4, in this embodiment, the server system 100 is implemented as shown in FIG. 4, for example. The first transmission interface I1 and the second transmission interface I2 are PCI-E interfaces, for example, and the first connection port 131 and the second connection port 141 are PCI-E connectors and set in default as uplink connection ports, for example. In this embodiment, the first expander unit 130 includes the first connection port 131 and a first exchanger 137. In addition, the first exchanger 137 is a PCI-E exchanger and adapted to connect to the first connection port 131 and the first peripheral device 150. The second expander unit 140 includes the second connection port 141 and the second exchanger 147. In addition, the second exchanger 147 is also a PCI-E exchanger and adapted to connect to the second connection port 141 and the second peripheral device 160.

Referring to FIG. 5, in the data access method according to the embodiment, after the server system 100 is turned on at Step S500, Step S510 is carried out. At Step S510, the server system 100 determines whether the second host 120 malfunctions, and the determination process at Step S510 further includes Step S511 to S513. Details in this respect are described in the following. First of all, at Step S511, the first host 110 determines whether the second host 120 successfully detects the second expander unit 140. In this embodiment, the first host 110 determines whether the second host 120 detects the second exchanger 147 of the second expander unit 140. How the first host 10 and the second host 120 communicate with each other has been described in the embodiment of FIG. 3. Thus, details in this respect will not be repeated in the following.

At Step S511, if the first host 110 determines that the second host 120 successfully detects the second expander unit 140, it is indicated that the second host 120 and the second expander unit 140 do not malfunction. Namely, the second host 120 may access the second peripheral device 160 through the second exchanger 147. Then, Step S540 is carried out. At Step 540, the first host 110 may access the first peripheral device 150 through the first expander unit 130, and the second host 120 may access the second peripheral device 160 through the second expander unit 140.

Alternatively, at Step S511, if the first host 110 determines that the second host 120 does not successfully detect the second expander unit 140, it is indicated that at least one of the second host 120 and the second expander unit 140 malfunctions. Then, Step S513 is carried out. At Step S513, the first host 110 may further detect the second host 120 to determine whether the second host 120 malfunctions. In this embodiment, the first host 110 may detect whether the second host 120 normally operates based on the external network address of the second host 120, for example. However, in other embodiments, the first host 110 may also detect whether the second host 120 normally operates based on a Bluetooth address or a LAN address, for example. If the first host 110 detects the second host 120 at Step S513, it is indicated that the second host 120 operates normally without malfunctioning, so it is determined that the second expander unit 140 malfunctions. Then, at Step S550, the first host 110 or the second host 120 sends a notification signal to notify the administrator to repair the second expander unit 140.

Alternatively, if the first host 110 does not detect the second host 120 at Step S513, it is determined that the second host 120 malfunctions, and Step S520 is carried out. At Step S520, the transmission direction of the first connection port 131 or the second connection port 141 is changed, such that the first host 110 is able to access the second peripheral device 160 through the first expander unit 130 and the second expander unit 140. In this embodiment, the first connection port 131 and the second connection port 141 are set in default as uplink connection ports. Thus, when the second host 120 malfunctions, the first host 110 may change the first connection port 131 into a downlink connection port. Consequently, the first host 110 is able to access the second peripheral device 160 through the first expander unit 130 and the second expander unit 140 at Step S530.

In view of the foregoing, in the server system according to the embodiments of the invention, the first host is coupled to the first peripheral device, and the second host is coupled to the second peripheral device. Therefore, the hosts in the server system may separately control a portion of the peripheral devices to optimize the number of peripheral devices controlled by each host. Moreover, in the embodiments of the invention, the first expander unit and the second expander unit in the server system are connected to each other. Thus, when the server system operates normally, the first host and the second host may access the first peripheral device and the second peripheral device respectively. However, when one of the hosts (e.g., the second host) malfunctions, another host (e.g., the first host) may take over the peripheral device (e.g., the second peripheral device) originally controlled by the malfunctioning host through the first expander unit and the second expander unit. In this way, when one of the hosts malfunctions, the peripheral device originally controlled by the malfunctioning host may remain accessible, thereby preventing hardware resources from being wasted.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A server system, comprising:
  a first server, comprising:
    a first host;
    a first expander unit, coupled to the first host; and
    a first peripheral device, coupled to the first expander unit; and
  a second server, comprising:
    a second host;
    a second expander unit, coupled to the second host through a data bus or a peripheral component interconnect express bus; and
    a second peripheral device, coupled to the second expander unit,
  wherein the first expander unit and the second expander unit are directly connected to each other through a serial attached small computer system interface or a peripheral component interconnect express bus,
  wherein when the first host and the second host function normally, the first host accesses the first peripheral device through the first expander unit and the second host accesses the second peripheral device through the second expander unit, and when the second host changes from normal function to malfunction, the first host accesses the second peripheral device through the serial attached small computer system interface or the peripheral component interconnect express bus between the first expander unit and the second expander unit.

2. The server system as claimed in claim 1, wherein the first expander unit comprises a first connection port, the second expander unit comprises a second connection port, and the first connection port and the second connection port are connected through a transmission interface,
  wherein the first connection port and the second connection port are set in default as connection ports having the same transmission direction, and
  when the second host malfunctions, the transmission direction of the first connection port or the second connection port is changed, such that the first host is able to access the second peripheral device through the first expander unit and the second expander unit.

3. The server system as claimed in claim 2, wherein the first connection port and the second connection port are set in default as uplink connection ports, and
  when the second host malfunctions, the first connection port is changed into a downlink connection port.

4. The server system as claimed in claim 2, wherein the first connection port and the second connection port are set in default as downlink connection ports, and
  when the second host malfunctions, the second connection port is changed into an uplink connection port.

5. The server system as claimed in claim 1, wherein the first host comprises a first network unit, and the second host comprises a second network unit,
  wherein the first network unit and the second network unit are connected to an external network, and the first host determines whether the second host malfunctions through the external network.

6. A data access method, adapted for a server system, wherein the server system comprises a first server and a second server, the first server comprises a first host, a first expander unit, and a first peripheral device, and the second host comprises a second host, a second expander unit, and a second peripheral device, wherein the first expander unit and the second expander unit are directly connected to each other through a serial attached small computer system interface or a peripheral component interconnect express bus, wherein when the first host and the second host function normally, the first host accesses the first peripheral device through the first expander unit and the second host accesses the second peripheral device through the second expander unit, the data access method comprising:
  determining whether the second host changes from normal function to malfunction; and
  accessing the second peripheral device through the first expander unit and the second expander unit by using the first host through the serial attached small computer system interface or the peripheral component interconnect express bus between the first expander unit and the second expander unit when the second host changes from normal function to malfunction,
  wherein the second expander unit is coupled to the second host through a data bus or a peripheral component interconnect express bus.

7. The data access method as claimed in claim 6, wherein the first expander unit comprises a first connection port, the second expander unit comprises a second connection port, the first connection port and the second connection port are connected through a transmission interface, and the first connection port and the second connection port are set in default as connection ports having the same transmission direction, the data access method further comprising:
  changing the transmission direction of the first connection port or the second connection port when the second host malfunctions, such that the first host is able to access the second peripheral device through the first expander unit and the second expander unit.

8. The data access method as claimed in claim 7, wherein the first connection port and the second connection port are set in default as uplink connection ports, wherein the step of changing the transmission direction of the first connection port or the second connection port comprises:
  changing the first connection port into a downlink connection port.

9. The data access method as claimed in claim 7, wherein the first connection port and the second connection port are set in default as downlink connection ports, wherein the step of changing the transmission direction of the first connection port or the second connection port comprises:
  changing the second connection port into an uplink connection port.

10. The data access method as claimed in claim 6, wherein the step of determining whether the second host malfunctions comprises:
  determining whether the second host detects the second expander unit; and
  determining that the second host does not malfunction if the second host detects the second expander unit.

11. The data access method as claimed in claim 10, wherein the step of determining whether the second host malfunctions further comprises:
  determining whether the first host detects the second host if the second hosts does not detect the second expander unit;
  determining that the second expander unit malfunctions if the first host detects the second host; and
  determining that the second host malfunctions if the first host does not detect the second host.

12. The data access method as claimed in claim 11, wherein the first host comprises a first network unit, the second host comprises a second network unit, the first network unit and the second network unit are connected to an external network, and the step of determining whether the first host detects the second host comprises:
  detecting the second host by using the first host through the external network.

* * * * *